May 4, 1943.     I. I. TUBBS     2,318,115
VALVE
Filed Oct. 14, 1940
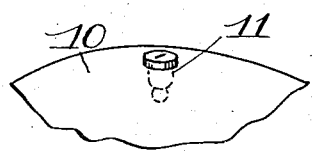
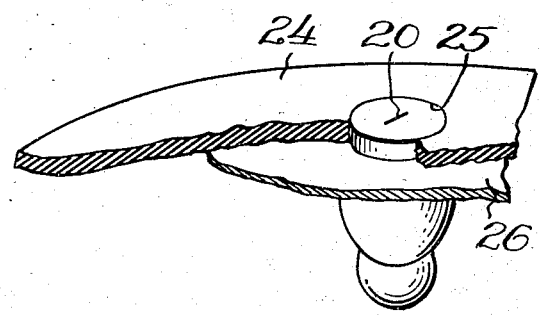
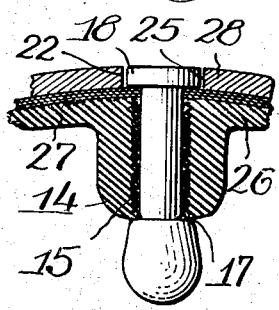
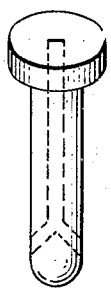
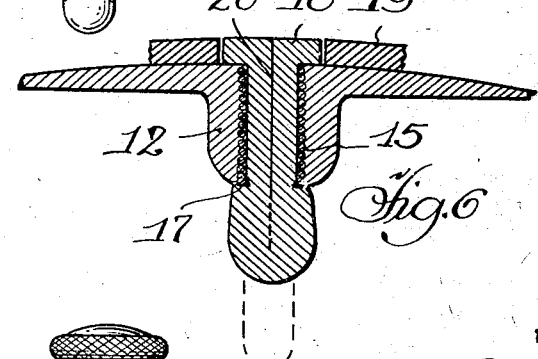
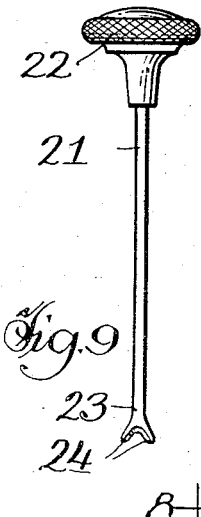
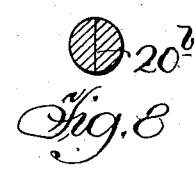
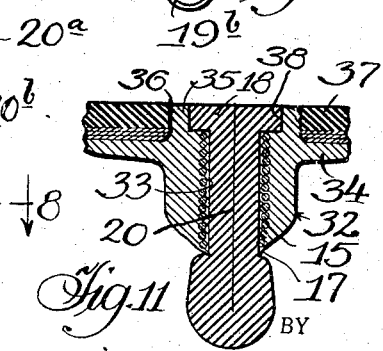
INVENTOR.
Ira I. Tubbs,
Sheridan Davis and Cargill
ATTORNEY.

Patented May 4, 1943

2,318,115

UNITED STATES PATENT OFFICE 2,318,115

VALVE

Ira I. Tubbs, Mount Vernon, Iowa, assignor to Margaret L. Tubbs, Mount Vernon, Iowa, as trustee Application October 14, 1940, Serial No. 361,069

12 Claims. (Cl. 273—65)

This invention relates to improvements in valves.

One object of the invention is to provide an improved valve structure for inflatable articles, such as footballs, basketballs or other pneumatic devices which comprises a valve closure member that is readily removable for replacement purposes if the valve becomes defective in use.

Another object of the invention is to provide a valve structure involving a removable valve closure member which, while removable for replacement purposes, requires no extraneous means for retaining it in proper sealing position in a valve casing.

An additional object of the invention is to provide a valve structure for inflatable articles having a valve closure member in the form of an elastic plug which is not only readily removable but which can be inserted in position in a valve structure by means of a simple tool manipulated from the exterior of the structure.

Other objects of the invention relate to various features of construction and arrangement of parts which will be apparent from a consideration of the following specification and accompanying drawing, wherein:

Figure 1 is a broken view of an inflatable article embodying an improved valve structure;

Figure 2 is a broken enlarged perspective view of an inflatable article illustrating an embodiment of the improved valve structure therein;

Figure 3 is a broken sectional view of an inflatable article showing the construction thereof more in detail and illustrating also an improved valve structure in position therein;

Figure 4 is a perspective view of an elastic valve closure member or plug comprising an element of the improved valve structure;

Figure 5 is a sectional view through an improved valve structure illustrating the closure member thereof in longitudinally distended relation, and a suitable tool for so distending the closure member;

Figure 6 is a sectional view through a valve structure illustrating the closure member in normal valve closing position, that is, the position which it assumes when the distending tool shown in Figure 5 has been removed;

Figure 7 is a perspective view of another embodiment of a valve closure member;

Figure 8 is a sectional view taken on the line 8—8 of Figure 7;

Figure 9 is a view of a suitable tool adapted for use in slitting or forming an inflation passage in a valve closure member of the type illustrated in the drawing;

Figure 10 is a perspective view of another form of valve closure member;

Figure 11 is a broken sectional view of an inflatable article provided with an improved valve structure embodying the present improvements;

Figure 12 is a perspective view of another embodiment of the valve closure member; and Figure 13 illustrates a suitable inserting tool for the member shown in Figure 12.

In the drawing 10 indicates an inflatable article such as a football, basket-ball or other pneumatic device having a valve structure indicated generally by the numeral 11 by means of which the article can be inflated. The valve structure comprises a casing 12, as illustrated in Figure 5, having a cylindrical aperture or passage 13 therethrough for receiving an elastic plug or valve closure member indicated generally by the numeral 14.

In Figs. 5 and 6 the embodiment of the valve casing illustrated has a non-elastic lining 15 which forms the wall of the passage 13. This non-elastic lining 15 may be formed of a cord wound helically on a mandrel and placed in the mold at the time the valve structure is molded, the valve casing preferably being made of rubber and comprises a flange or patch 16 by means of which the structure can be attached to the inner wall of the inflatable article, or to the bladder of the article where a bladder-type construction is employed. The valve casing may also be formed as an integral part of the bladder or of an article carcass of the type which requires no bladder. The lining 15, as shown in Figures 5 and 6, terminates above the lower end of the casing 12, which lower end may be provided with an inwardly directed rubber flange 17 of slightly smaller internal diameter than the diameter of the superjacent portion of the passage 13. The valve closure member or plug 14 preferably is molded or otherwise formed of elastic material such as rubber and comprises a head 18 and a shank 19, the original or normal diameter of the shank being greater than the diameter of the passage 13 of the valve casing in which the closure member is to be employed. The casing 12, if not rendered inelastic by a lining or the like, is formed of a rubber or other material which is relatively non-elastic as compared with the material of which the plug 14 is formed.

The closure member 14 is provided with a suitable inflation passage, that is, a passage into which an inflating instrument such as a hollow needle of a pump may be inserted for inflating the article on which the valve structure is employed. The inflating passage is indicated by the numeral 20 in the form of the invention shown in Figures 1 to 6, inclusive, and may be formed by any suitable cutting device such as that shown in Figure 9. In Figure 9 the device illustrated comprises a shank 21 having a knob 22 at its upper end, and a lower end comprising a forked or bifurcated blade 23 having a cutting edge 24. By forcing the cutting edge downwardly through the head 18 and shank 19 of the closure member, the inflation passage 20 can be formed without removing any of the closure member material. In other words, the material is merely parted along the plane of severance and is in the form of a slit. The inflation passage terminates short of the lower end of the member 14 and in the form of the closure member shown in Figures 1 to 6, inclusive, the passage terminates in two air-discharge orifices 20a through either of which the discharge end of the inflating needle of a pump (not shown) may be passed preparatory to inflating the article.

In Figure 2 of the drawing the article therein illustrated has a cover 24 provided with a circular recess 25 in which the head 18 of the valve closure member seats with the outer surface thereof flush with the outer surface of the article. The valve casing is attached to a bladder 26 by vulcanizing or otherwise securing the flange or patch 16 thereto.

In Figure 3 the article is shown as comprising a form-defining laminated carcass 27 having a cover 28 thereon also provided with a recess 22 for accommodating the head 18 of the valve closure member 14. The bladder 26 has the valve casing formed integral therewith.

In inserting the closure member or plug 14 in the valve casing in any of the modifications of the inflatable article above described, a suitable tool such as is shown in Figure 5 may be employed. This tool may comprise a shank 29 having a knob 30 at its outer end and at its inner end having a portion 31 adapted to engage the lower unslitted end of the member 14 when the tool has been inserted into the inflation passage. The portion 31, in the form of the tool illustrated, is shown as being bifurcated and as being somewhat similar to the blade 23 of the inflation passage-forming tool shown in Figure 9, although the member 31 of the plug inserting tool is, of course, not sharpened. Upon placing the inserting tool in the inflation passage of a closure member and applying pressure on the knob while holding the head 18 of the member between the fingers, or with a suitable tool, the shank 19 of the closure member can be distended due to its elasticity. In so distending the shank its diameter may be reduced sufficiently to enable the closure member to be inserted in the passage 13 of the valve casing, as shown in Figure 5. Upon withdrawal of the inserting tool, the inherent elasticity of the shank causes the lower end thereof, which extends beyond the lower end of the casing 12, to contract longitudinally and resume or tend to resume its original cross sectional area as illustrated in Figure 4. Inasmuch as the casing 12 is relatively non-distendable, the intermediate portion of the closure member, that is, the portion between the head 18 and the lower end of the shank which projects beneath the lower end of the casing is held against return to its normal diameter. However, due to its elasticity, this intermediate portion of the shank expands radially into firm and air-tight contact with the wall 15 of the passage 13. The closure member, as will be seen, tends to contract longitudinally upon release by the inserting tool and hence the enlarged lower end of the member is drawn firmly into contact or abutting relation with the lower end of the casing 12 and thereby retains the closure member in position against expulsion by the air pressure within the article and also cooperates with the intermediate portion of the shank in preventing leakage of air from the inflatable member between the shank and the wall of the passage 13.

In the embodiment of the improvements shown in Figure 6 the flange 17 which, as above described, is located beneath the lower end of the lining 15 circumferentially engages the shank and thus forms an additional barrier to the escape of air between the shank and the wall of the passage. Inasmuch as the intermediate portion of the shank is retained by the casing in a state of radial contraction, the inflation passage 12 is held in closed relation against leakage of air from the article.

As will be seen in Figure 6, the lower end of the passage 20, particularly the air-exit portions 20a thereof, are located beneath the inner end of the casing 12. The pressure of the air within the inflatable member tends to hold the mating surfaces of the slit 20 in closely contacting relation, thus preventing the escape of air from the inflatable member through the inflation slit. In inflating an article provided with the improved valve structure, a conventional hollow needle-like or tubular nozzle is passed downwardly into the inflation passage 20 and through one of the ports 20a, whereupon the pump can force air into the interior of the article. Upon retraction of the tool the passage 20 is closed not only by the pressure of the air acting on the lower exposed end of the closure member but by reason of the contractile force exerted on the intermediate portion thereof by the casing.

In the closure member 14 above described the inflation passage is of a width less than the diameter of the shank 14, but in the embodiment of the closure member illustrated in Figures 7 and 8 the passage or slit may be co-extensive with the diameter of the shank. In Figures 7 and 8 this slit or closure member is indicated by the reference character 20b. The closure member illustrated in Figures 7 and 8 may be inserted in a valve casing by a suitable tool in the manner above described.

In Figure 10 the valve closure member there illustrated is similar to the form shown in Figures 7 and 8, except that the slit through the head extends diametrically of the head, thus dividing the closure member into two portions which are connected by the unsevered lower portion of the shank. In said figures the portions are shown in separated positions for the purpose of clarity, the head portions being designated 18a, the shank portions 19a and the lower unsevered end of the shank as 19b.

In the embodiments shown in Figures 7, 8 and 10, each slit terminates within the portion of the shank which extends beneath the lower end of the valve casing when the closure member is in the operative position corresponding to that shown in Figure 6 of the drawing. Hence the lateral edges of the lower portions of the respective slits constitute outlets through which the discharge end of a needle of an air pump or the like can be passed during the inflation of the article. In other respects the valve closure member illustrated in Figure 10 functions similarly to those above mentioned.

In Fig. 11 of the drawing, the valve casing is indicated generally by the numeral 32 and is provided with a cylindrical passage 33 for receiving the valve closure member and has a flange 34 by means of which the structure may be attached to a bladder or the like of an inflatable article, i. e., it may be attached by adhesive or by vulcanizing to a bladder or to a wall of an article of the type where no separate bladder is employed, or the casing may be formed integral with a bladder or with a carcass of an article of the latter type.

The valve casing 32 has an integral upward extension 35 which seats in an aperture 36 of a cover 37, the outer end of the extension being flush with the surface of the cover and the periphery of which may be cemented to the surrounding edge of the cover material. This construction protects the cover material adjacent the opening 36 from damage by tools employed in extracting valve closure members or in inserting such members in the valve casing. The extension 35 is provided with a recess 38 for receiving the head 18 of a valve closure member the outer surface of which is flush with the outer surface of the extension. In removing the closure member (which may correspond in structure to any above described) a tool is inserted between the flexible head 18 and the adjacent wall of the recess 38 and into engagement with the upper portion of the shank of the closure member as hereinafter described.

For the purpose of facilitating the insertion of an extracting tool the heads of the closure members above described may be flared or tapered as illustrated in Figure 12. In said figure the valve 39 is not shown as provided with an inflation slit inasmuch as, for inflation purposes, an inflating needle can be inserted between the exterior wall of the valve and the wall of a valve passage 13. An opening which may be in the form of a recess 40 is provided adjacent the lower end of the valve shank for receiving an offset end of an inserting tool illustrated in Figure 13. The tool comprises a shank 41 and an offset end 42 adapted to be inserted in the recess 40 preparatory to inserting the closure member in a valve casing. The head of the valve may be engaged by another tool, such as a pliers, for example, and the shank then stretched or distended and inserted in the casing while in that condition. By simple manipulation of the inserting tool the end portion 42 can be removed from the aperture 40 and the tool then withdrawn, leaving the closure member in position in the valve casing preparatory to inflating the article.

In all the forms of the invention illustrated, the heads of the valve closure member limit the extent to which the closure members may be inserted in the valve casing and thus prevent the closure member from being forced wholly into the inflatable article, either during the insertion of the valve closure member into the casing as above described, or during use of the article.

While the lower distended end of the closure member abuts the lower end of the casing 12, as shown in Figure 6, and prevents the closure member from being expelled from the casing by pressure of the air in the article, the valve closure member may be removed for replacement purposes or for removing foreign particles from the inflation opening when desired. For this purpose any suitable tool may be employed, such as a pair of sharp-nosed pliers, for example, the points of the jaws of which are inserted under the flexible head 18 to enable the tool to grasp the upper end of the shank. By pulling upwardly on the closure member, as by the tool mentioned, it can be distended and caused to creep slowly outwardly of the casing. If desired, a valve inserting tool, such as that shown in Figure 5, may be used during the removal of closure members of the type illustrated in Figures 1 to 11, that is, the inserting tool can be employed to distend the shank of the closure member longitudinally as suggested in Figure 5 and then by engaging the closure member by pliers or other suitable tool as above mentioned, the shank can be lifted from the casing.

In all the embodiments of the invention above described the valve closure members can be removed readily for replacement purposes since they are not structurally united to the valve casing nor to the carcass of the article but are retained in position in the valve casing by the radial expanding action of the closure members resulting from longitudinally distending the members during the insertion of the same in the valve casing. The novel valve closure means can be employed with valve casings whether the latter are formed as integral portions of bladders or carcasses of inflatable articles or are vulcanized or otherwise secured thereto.

While I have shown and described certain embodiments of my improvements for the purpose of illustration, it will be apparent that various changes may be made therein without departing from the spirit of the invention.

I claim:

1. A valve for an inflatable article comprising a valve casing having a cylindrical passage therethrough for receiving a closure member, a removable cylindrical closure member of elastic material for said passage of a diameter greater than said passage and having an inflation slit extending longitudinally from the outer end to adjacent the inner end thereof and extending radially at said inner end to the wall of said member, said slit being adapted to receive a tool engageable with the wall of the slit at the inner end thereof for distending the closure member longitudinally to effect circumferential contraction thereof sufficiently to enable the closure member to be removed from operative position in said passage or to be inserted into said operative position wherein the inner end of the slit is disposed inwardly of the inner end of the casing and through which air from an inflating device inserted into said slit can pass into the article in inflating the same, the portion of the closure member within said passage being adapted to expand radially into sealing contact with the wall of the passage when the member is released from the distending force of the tool and to retain the slit closed against leakage upon withdrawal of the inflating device.

2. A valve for an inflatable article comprising a valve casing having a cylindrical passage therethrough, a removable valve closure member of elastic material in said passage provided with an inflation slit extending from the outer end to adjacent the inner end thereof, said inner end of the member and the inner end of the slit being disposed inwardly of the inner end of the casing whereby an inflation device can be inserted through said slit for discharging air into the article, the portion of the closure member within said passage being retained under radial compression by the wall of said passage for closing the slit against escape of air upon withdrawal of the inflating device, and a head at the outer end of the said member for limiting inward movement of the member and constituting means for engagement by a tool in removing the member from the valve casing.

3. A valve structure for an inflatable article comprising a valve casing having a cylindrical passage therethrough, a removable cylindrical closure member for the passage of greater normal diameter than the diameter of said passage, said member being provided with an inflation passage and having an intermediate portion normally retained under radial compression by the walls of said passage for closing said inflation passage, said member having a portion at the inner end of the inflation passage for engagement by a tool in distending the closure member longitudinally preparatory to inserting the closure member into position in the casing and a head at the outer end of said member for limiting the inward movement thereof and constituting means for engagement by a tool for extracting the member from the casing.

4. A valve casing having a receiving passage therethrough for a valve closure member and a valve closure member for said passage provided with a head at the outer end for limiting inward movement of the closure member and a shank of elastic material of an original diameter greater than the diameter of said passage, said closure member having a longitudinal inflation passage therein terminating at its inner end short of the inner end of the shank and adapted to receive a tool engageable with said inner end portion of the shank whereby the shank can be distended longitudinally to effect the circumferential contraction of the shank to a diameter enabling the shank to be inserted freely in the receiving passage or removed therefrom, said inner end of the shank extending beyond the inner end of said casing when the closure member is in normal position in said casing passage and constituting an abutment engaging the inner end of the casing to resist outward movement of the closure member, the intermediate portion of the shank being retained normally in circumferentially contracted relation by the wall of said casing passage for closing the inflation passage to prevent escape of air therethrough.

5. A valve for an inflatable article comprising a valve casing provided with a passage therethrough for receiving a valve closure member, and a valve closure member comprising a head and a shank of elastic material having an original diameter greater than the diameter of the passage and provided with an inflation passage extending through the head and shank to and terminating adjacent the inner end of the latter whereby a tool can be inserted into the inflation passage into engagement with the wall at the terminal end of the inflation passage for distending the shank longitudinally sufficiently to contract it circumferentially whereby the shank can be inserted inwardly of the valve passage to move the head into limiting relation over the outer end of the valve passage and said inner end of the shank beyond the inner end of the body member whereby said inner end can contract longitudinally and expand circumferentially upon removal of the tool and into contact with the inner end of the casing for resisting outward movement of the closure member from the casing, the intermediate portion of the shank being retained in circumferentially contracted relation by the walls of the valve passage for retaining the inflation passage closed to prevent escape of air therethrough.

6. A valve having a cylindrical passage therethrough and a removable closure member in said passage comprising a head at the outer end of said member for limiting the inward movement of said member within said passage and having an elastic shank provided with a portion within said passage and an inner end portion projecting beyond and in abutting relation with the inner end of said casing to seal said passage and to prevent expulsion of the closure member from the casing, said inner end of the shank being provided with means for engagement by a distending tool whereby the shank can be extended longitudinally to reduce the diameter thereof sufficiently to enable the shank while so distended to be inserted in said passage from the outer end of the latter, said shank and the inner end of said closure member being longitudinally distendable under tension applied to the closure member at the head thereof whereby the closure member can be removed from said passage.

7. A valve for an inflatable article comprising a valve casing having a cylindrical receiving passage therethrough provided with an enlarged portion located at its outer end, and a cylindrical valve closure member for said passage having a head at the outer end seating within said enlarged portion of said passage and an elastic shank of greater normal diameter than the lesser diameter of said passage and provided with means at the inner end for engagement by a distending tool whereby the shank can be distended longitudinally and contracted circumferentially to enable the same to be inserted through said passage and being of such length that the inner end when released by said tool provides an abutment engaging the end of said casing preventing the expulsion of said closure member from said passage, said closure member being retained in position solely by said abutment and the expansible force exerted by the shank on the wall of said passage whereby the closure member is removable by a force exerted on said head in an outward direction sufficient to effect the progressive longitudinal distension and radial contraction of the shank.

8. In an inflatable article a member having an opening therein and a valve casing provided with a passage communicating with the inside and outside of said article through said opening, a removable valve member controlling the passage of air through said passage, comprising an elastic portion with a normal diameter greater than that of said passage and longitudinally distended and disposed in said passage, an elastic inner end portion with a diameter greater than that of said passage and integral with the first said portion and providing retaining means yieldably engaging said casing at the inner end of said passage for releasably retaining said valve member in said casing, and an outer end portion with a diameter greater than that of said passage and of a length to extend through the opening in the member and integral with the first said portion and providing handle means outside of said passage for removing said valve member from said casing through said opening.

9. In an inflatable article, a member having an opening therein, a valve for controlling the passage of air into and out of said article, comprising casing means with a passage therein, and passage closing means, one of said means being relatively elastic and elastically deformed in one direction and providing a sufficient elastic force transversely of the direction of deformation yieldably and removably to seat said passage closing means in said passage and to close the same and to retain said closing means in said passage against expulsion therefrom by the pressure in said article, and means carried by said passage closing means and accessible from outside said article through the opening in said member for removing said passage closing means from said passage.

10. A removable valve closure member for a valve passage, comprising an elastic shank of greater normal diameter than the diameter of said passage and having means integral with one end of the shank for engagement by an inserting tool whereby the shank can be distended longitudinally to reduce the diameter thereof sufficiently to enable the shank to be inserted into said passage and handle means at the opposite end of said shank whereby a force may be exerted thereon in an outward direction sufficient to effect the progressive longitudinal distention and radial contractions of the shank to remove it from said passage.

11. A valve for an inflatable article comprising a valve body having a valve passage therein and an elastic valve member of a normal diameter greater than the diameter of said passage and of substantially greater length than said passage when located therein so as to extend therethrough and beyond the inner end thereof and to engage the inner end of said body surrounding the passage, said member having a head at the outer end and a tool-engageable portion adjacent the inner end whereby the member can be distended longitudinally to reduce the diameter thereof to enable the same to be inserted in the valve passage whereby upon release of the distending force the valve member expands radially into circumferential contact with the wall of the valve passage, said wall being relatively non-distendable radially by the expansive force exerted thereon by said member whereby the latter forms a close seal with said wall and the inner end of said body to prevent leakage along the exterior of said valve member.

12. A removable valve closure member for a valve passage comprising an elastic shank having an inflation slit therein extending from the outer end to adjacent the inner end thereof, said shank having a greater normal diameter than the diameter of said passage and having means integral with the end of the shank adjacent the inner end of said slit for engagement by an inserting tool whereby the shank can be distended longitudinally to reduce the diameter thereof sufficiently to enable the shank to be inserted into said passage and handle means at the opposite end of said shank whereby a force may be exerted thereon in an outward direction sufficient to effect the progressive longitudinal distention and radial contractions of the shank to remove it from said passage.

IRA I. TUBBS.